Patented Dec. 22, 1936

2,064,979

UNITED STATES PATENT OFFICE 2,064,979

PRODUCTION OF ALKALI ORTHO-PHOSPHATES

Oskar Kaselitz, Berlin, Germany

No Drawing. Application January 21, 1935, Serial No. 2,794. In Germany December 9, 1933

7 Claims. (Cl. 23—107)

My invention relates to the production of alkali phosphates and more especially to a process for converting metaphosphates and/or pyrophosphates, to which may be admixed orthophosphates and which may be dissolved in the respective acids, into orthophosphates.

It is an object of my invention to provide means whereby such a conversion can be brought about in a simple and commercial manner.

As is well known to those skilled in the art, if a mixture of potassium chloride and phosphoric acid is heated in order to quickly and completely drive out the hydrogen chloride, the mixture must be heated to temperatures, at which a far reaching dehydration takes place, pyrophosphates and metaphosphates being formed, to which some acid in excess may be admixed. The masses obtained when the fused reaction products have cooled down, present a tough glass-like consistency and can be subjected to further treatment only under considerable difficulties. Since the fused reaction product is hygroscopic and since it is doubtful whether fertilization with this product is injurious to the plants, direct utilization of the fused reaction product is not possible.

It has therefore been suggested to render these products soluble in water by chilling, for instance by pouring them onto cold metal plates. However the soluble metaphosphates and pyrophosphates produced in this manner must be dissolved in order to convert them into orthophosphates and require being hydrated in a separate time consuming operation.

One has tried to avoid the dehydration by applying special steps, however in that case also the duration of the reaction will be considerably protracted.

I have now found that the expulsion of the hydrogen chloride can be effected at higher temperature, if the present process of converting the metaphosphates and pyrophosphates into orthophosphates is applied.

According to the present invention molten masses consisting of a mixture of metaphosphates, pyrophosphates and orthophosphates, which may be dissolved in a mixture of the respective acids, can be converted instantaneously and in a single operation into orthophosphates by mixing the molten mass, while it is still hot (above 250° C.) or the mass heated to this temperature as vigorously as possible with phosphoric acid containing water. In practising this process care should be taken to use only such quantities of phosphoric acid (which may be preheated) that after evaporation of water has taken place, some water still remains over.

By introducing into the molten mass only the required quantity of phosphoric acid, it is possible to effect hydration at the highest possible temperature and in consequence thereof instantaneously. The reaction mass solidifies on cooling; when converting potassium chloride into potassium phosphate, it consists mainly of the acid salt $KH_2PO_4.H_3PO_4$, which can be converted in a well known manner into potassium orthophosphate by dissolving it in water to form a solution of about 1.25 specific gravity and heating this solution under pressure, preferably by means of superheated steam, to a temperature above the boiling point of the solution. The higher the temperature, the quicker will be the conversion, which, when operating at 120° C., will come to an end within about 2 hours.

Instead of acting on the fused reaction product with phosphoric acid, one may also replace this acid partly or altogether by the mother liquor formed in a prior operation. This process is adapted for use in the hydration of all alkali salts, including the ammonium salts of meta- and pyrophosphoric acids and of the free acids.

In practising my invention I may for instance proceed as follows:

Example 1

158 grams KCl are heated with 387 grams phosphoric acid of 89% within 25 minutes to 310° C. During the heating about 96% of the chlorine are driven off under the form of hydrogen chloride. The hot reaction product, being a mixture of orthophosphate, metaphosphate and pyrophosphate and of the respective acids, is mixed as intimately as possible with 200 cubic centimetres water. After cooling and crystallization there are obtained 152 grams moist crystals containing 49.80% $P_2O_5$, 4.06% $P_2O_7$ and 28.90% $K_2O$. By recrystallization this product can be converted in a well known manner into potassium orthophosphate free from pyrophosphate. The mother liquors may be reused in cycle.

Example 2

158 grams KCl are heated with 387 grams phosphoric acid of 89% within 30 minutes to 320° C., whereby 96.6% of the chlorine is driven out under the form of hydrogen chloride. The molten mass is mixed at the temperature of 320° C. with 344 grams of the mother liquor obtained in a prior operation, which contains 42.76% P₂O₅, 8.24% P₂O₇ and 14.06% K₂O. After cooling there are obtained 757 grams moist crystals containing 54.04% P₂O₅, 3.09% P₂O₇ and 19.47% K₂O.

By operating in this manner one obtains the acid salt $KH_2PO_4.H_3PO_4$, which can be converted into $KH_2PO_4$ in a well known manner.

*Example 3*

158 grams KCl are heated with 387 grams phosphoric acid ($H_3PO_4$) of 89% within 30 minutes to 310° C., whereby 95.1% of the chlorine are driven off as hydrogen chloride. The molten mass obtained in this operation is mixed as intimately as possible at 310° C. with 487 grams of a phosphoric acid containing 36.4% $P_2O_5$. After cooling are obtained 552 grams moist crystals containing 56.12% $P_2O_5$, 1.38% $P_2O_7$ and 18.97% $K_2O$. Here also the acid salt $KH_2PO_4.H_3PO_4$ is obtained, which can be converted into $KH_2PO_4$ in a well known manner.

Various changes may be made in the details disclosed in the foregoing specification without departing from the invention or sacrificing the advantages thereof.

I claim:—

1. The process of converting phosphates selected from the group consisting of alkali metal metaphosphates and pyrophosphates into orthophosphates comprising bringing the starting products at a temperature above about 250° C. into contact with water.

2. The process of converting phosphates selected from the group consisting of alkali metal metaphosphates and pyrophosphates into orthophosphates comprising bringing the starting products at a temperature above about 250° C. into contact with phosphoric acid containing water.

3. The process of converting phosphates selected from the group consisting of alkali metal metaphosphates and pyrophosphates into orthophosphates comprising bringing the starting products at a temperature above about 250° C. into contact with a phosphate solution containing water.

4. The process of converting phosphates selected from the group consisting of alkali metal metaphosphates and pyrophosphates into orthophosphates comprising bringing the starting products at a temperature above about 250° C. into contact with a mother liquor obtained in a preceding operation.

5. The process of converting an alkali chloride into alkali orthophosphate comprising heating the chloride together with phosphoric acid to a high temperature to drive off at least 90% of the chlorine under the form of hydrogen chloride, intimately mixing the fused mass containing alkali metaphosphate and alkali pyrophosphate while the mass is still hot (above 250° C.), with water and recrystallizing the crystal mixture obtained on cooling.

6. The process of converting an alkali chloride into alkali orthophosphate comprising heating the chloride together with phosphoric acid to a high temterature to drive off at least 90% of the chlorine under the form of hydrogen chloride, intimately mixing the fused mass containing alkali metaphosphate and alkali pyrophosphate, while the mass is still hot (above 250° C.), with the mother liquor resulting from a preceding operation and recrystallizing the crystal mixture obtained on cooling.

7. The process of converting an alkali chloride into alkali orthophosphate comprising heating the chloride together with phosphoric acid to a high temperature to drive off at least 90% of the chlorine under the form of hydrogen chloride, intimately mixing the fused mass containing alkali metaphosphate and alkali pyrophosphate, while the mass is still hot (above 250° C.), with phosphoric acid containing water and recrystallizing the crystal mixture obtained on cooling.

OSKAR KASELITZ.